Sept. 12, 1967  E. O. SCHWEITZER  3,341,860
INK PRESSURIZING AND RELIEVING SYSTEM FOR A RECORDER
Filed Nov. 4, 1964  2 Sheets-Sheet 1

INVENTOR.
EARL O. SCHWEITZER
BY
ATTORNEY

Sept. 12, 1967     E. O. SCHWEITZER     3,341,860
INK PRESSURIZING AND RELIEVING SYSTEM FOR A RECORDER
Filed Nov. 4, 1964     2 Sheets-Sheet 2

*INVENTOR.*
EARL O. SCHWEITZER
BY
*Elon J. Hyde*
ATTORNEY

United States Patent Office 3,341,860
Patented Sept. 12, 1967

3,341,860
INK PRESSURIZING AND RELIEVING SYSTEM FOR A RECORDER
Earl O. Schweitzer, Wickliffe, Ohio, assignor to Clevite Corporation, a corporation of Ohio
Filed Nov. 4, 1964, Ser. No. 408,910
7 Claims. (Cl. 346—140)

This invention relates to recording devices and more particularly to an improved writing system for a pen recorder having a movable record medium.

In United States Patent No. 3,054,109, assigned to the same assignee as the present invention, there is disclosed in connection with an oscillographic recorder, a pressurized ink feed system. The present invention contemplates certain improvements to the pressurized inking system disclosed in said patent.

The writing system disclosed in the aforementioned patent basically comprises one or more writing pens each having a tubular tip, the entire periphery of which is effectively sealed against the surface of the record medium during a writing operation. A pressurized source of viscous writing ink is connected to an ink supply manifold for the pen, the latter being biased against the record medium with sufficient force that the ink pressure is insufficient to break the effective seal. A shut-off valve is provided to selectively connect or disconnect the pressurized ink source to the ink manifold.

The inking system disclosed in the aforementioned patent is advantageously independent of gravitational and acceleration forces, temperature and altitude effects, and substantially eliminates drying and clogging of the ink within the pen. However, even though the system has resulted in a substantial advance in the recording art, it has been found to be subject to several operational characteristics which are objectionable in some instances. One objectionable characteristic is that even after closure of the aforementioned shut-off valve a remanent pressure exists between the shut-off valve and pen tip which causes ink to be discharged from the pen tip when the pen is lifted for servicing, etc. Another characteristic which is sometimes objectionable lies in the fact that the previous system could not operate upside down. The present device is completely independent of position.

Another characteristic encountered in a multi-pen recorder having a single ink manifold connected to supply a plurality of pens is the tendency of one pen when removed from contact with the record medium to act as a vent for the manifold resulting in ink leakage from the other pens under the influence of gravity even in the absence of the remanent pressure condition. Such characteristics have been found to render pen servicing and replacement of the record medium difficult.

It is accordingly a principal object of the present invention to provide an improved pressurized ink writing system for a recorder wherein a closed, fluid-filled system is employed, and wherein the system is independent of position, gravitational forces and changes in ambient pressure and temperature.

Another object of the invention is to provide a pressurized inking system which is devoid of entrapped air or gas which causes drying of the ink and which can under some severe operational environments cause a vapor lock in the ink feed system.

Another object of the invention is to automatically relieve the remanent pressure in fluid-filled pressurized ink writing systems after a source of pressurized ink is disconnected from the system.

Another object of the invention is to provide an improved time-delay pressure relief valve for a fluid-filled pressurized ink system.

Another object of the invention is to provide an improved pressure source for a fluid-filled ink supply system for a pressurized ink recording instrument, which pressure source relieves itself when the instrument is turned off, and which maintains the system full of ink so that recording is instantaneous when the recorder is turned on.

For a better understanding of the present invention, together with other and further objects thereof, reference is had to the following description taken in connection with the accompanying drawings, and its scope will be pointed out in the appended claims.

Figure 1:
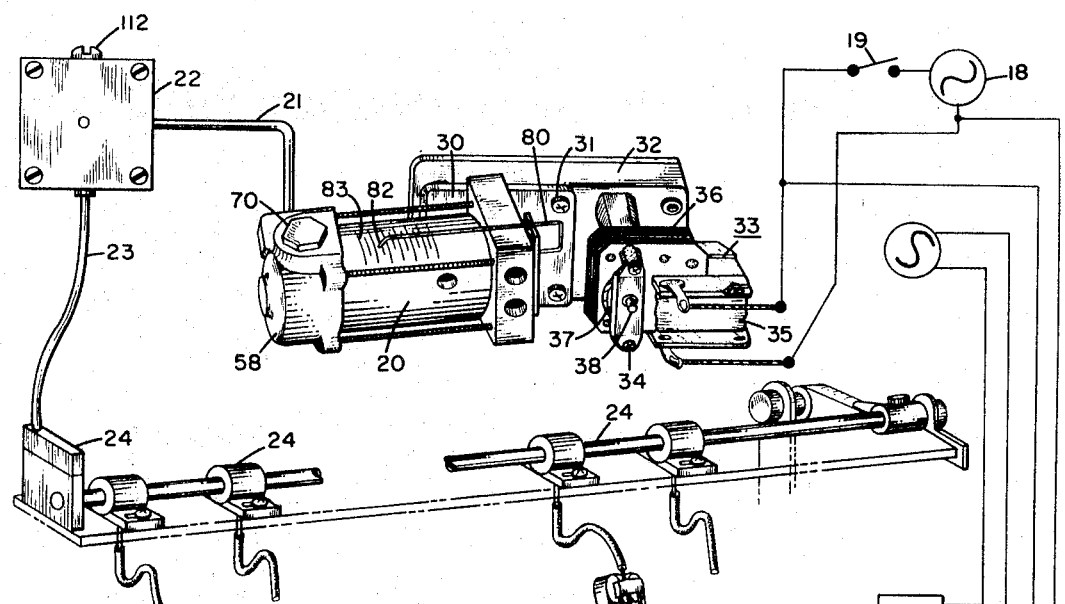
FIGURE 1 is a schematic illustration of a pressurized fluid-filled ink writing system for an instrument.
Figure 6:
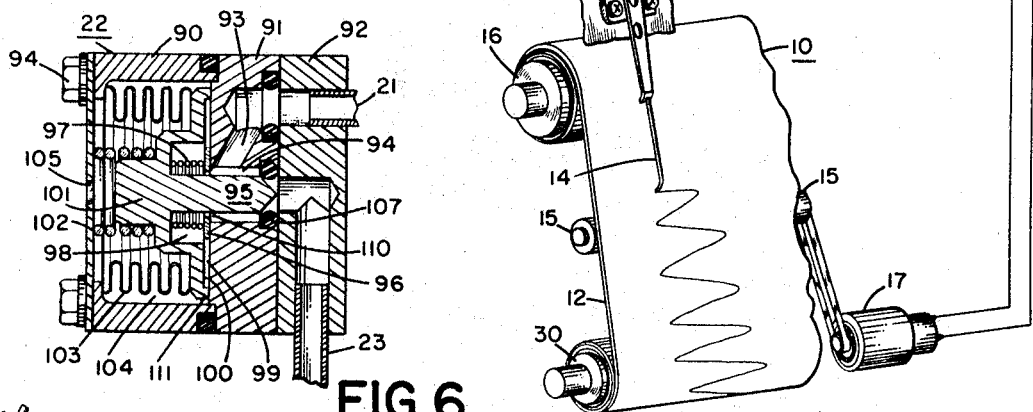
FIGURE 6 is a sectional view showing the details of the pressure relief valve.
Figure 2:
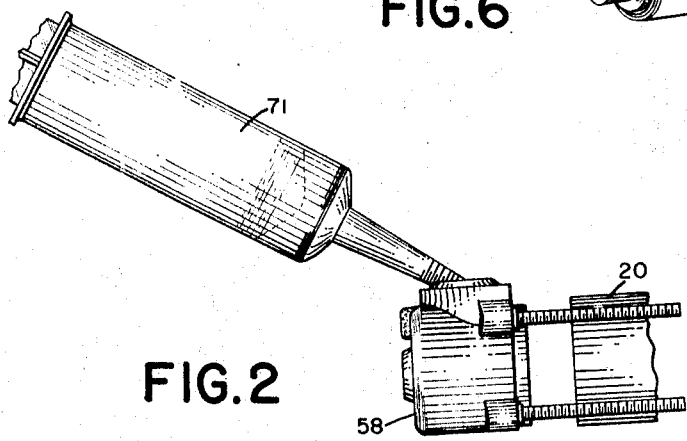
FIGURE 2 is a broken-away view of a portion of FIGURE 1 showing how the ink reservoir is refilled.

Referring to FIGURE 1 of the drawings there is shown a recorder identified generally by the reference numeral 10. While, as will be apparent to those skilled in the art, the inventive features are applicable to various types of recording devices, the particular recorder 10 disclosed for exemplary purposes comprises a high speed oscillographic pen recorder having a movable record medium or strip chart 12 adapted to be engaged and marked by one or more writing pens 14. The record medium 12 is stored on a main storage roller 16 and is driven at a constant rate of speed past the tips of pens 14 by means of motor 17 energized from power source 18 through switch 19 driving a drive roller 15, the medium is then stored on a rewind roller 30. The drive and roller system is shown schematically as the details thereof do not form part of this invention.

It will be apparent that suitable motor means 17 may be arranged to drive roller 15 to effect movement of record medium 12 at any select one of a large number of uniform constant velocities. The pen 14 has a tubular tip which engages and is biased against the record medium 12 as it passes over the surface to leave an ink trace representative, for example, of the magnitude of a variable condition.

Each of the one or more pens 14 is positioned relative to record medium 12 by means of a suitable pen supporting and driving mechanism contained within a housing (not shown). Preferably the driving and supporting mechanism includes biasing means for maintaining engagement of the pen tip with the record medium 12 during a writing operation to insure an effective seal between the tip and the record medium.

Figure 3:
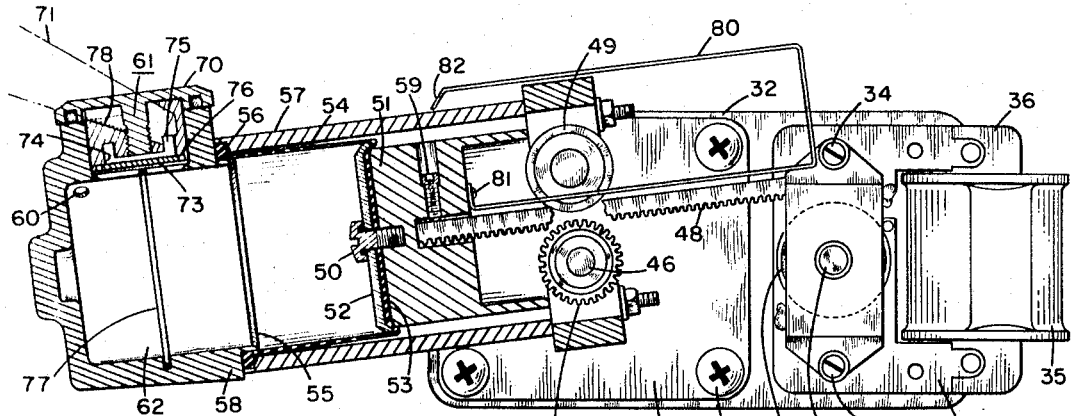
FIGURE 3 is a longitudinal sectional view taken through the ink reservoir and ink pressurizing device.

The system depicted in FIGURE 3 for supplying liquid ink to pens 14 comprises an improved pressurized inking system and a distribution system which is similar to that disclosed in my United States patent application Ser. No. 265,394, filed Mar. 15, 1963, for a Recorder and Inking System Therefor.

In general, the system includes a reservoir 20 of viscous liquid ink connected by pipe 21 to a time delay valve 22 and pipe 23 to an ink distributing manifold device 24 which is described in detail in my application Ser. No. 265,394. The manifold device 24 distributes ink to the one or more pens 14 and is not part of this invention.

The present invention is concerned with the improvement in the reservoir 20 and the means for pressurizing it, and in the details of the time delay valve 22.

Figure 4:
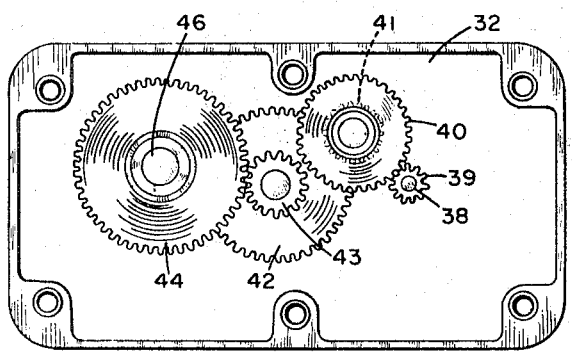
FIGURE 4 is a plan view of the gear box with its cover removed.
Figure 5:
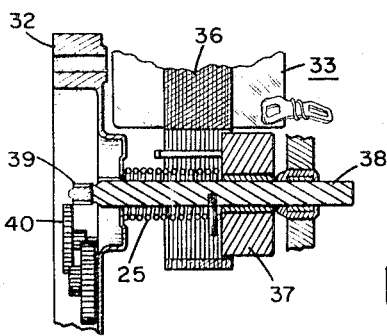
FIGURE 5 is a detail view of the motor which pressurizes the ink in the reservoir.

The reservoir 20 is connected by plate 30 and screws 31 to a gear box 32 and gear box 32 is connected to a motor 33 by means of screws 34. Motor 33 is energized by power source 18 when switch 19 is closed. Motor coil 35 is energized to magnetize the soft iron pole piece 36 and pull the rotor 37 into the pole piece. Rotor 37 rotates with shaft 38 thereby rotating gear 39 (FIGURE 4) which is mounted on it. The gear 39 in gear box 32 is out of mesh with gear 40 until motor 33 is energized to cause the rotor and shaft 37 to move axially toward the gear box. The movement of rotor 37 and its shaft 38 causes gear 39 to move into meshing engagement with gear 40 against the bias of spring 25 located between the gear box 32 and the rotor 37. Spring 25 preferably is a helical spring mounted around shaft 38. With the motor energized and gear 39 meshing with gear 40 rotation of rotor 37 drives through gears 41, 42, 43 and 44 to rotate shaft 46. Gear 47 mounted on shaft 46 meshes with rack 48 to drive it linearly. A plastic guide 49 is mounted above rack 48 to stabilize its vertical location and maintain engagement between the gear 47 and the rack 48.

The left-hand end of rack 48 (as seen in FIGURE 3) is connected by set screw 59 to a metal member 51 which serves as a piston, and screw 50 holds a cap 52 against the member 51 with the end portion 53 of a rolling rubber diaphragm 54 therebetween to provide a seal. The open end 55 of the rolling diaphragm 54 is sealed at 56 between tubular housing member 57 and the end portion 58 of the reservoir housing. The subassembly comprised of the piston member 51, the cap 52 and the rolling diaphragm 54 form, together with the reservoir housing, a completely sealed ink chamber. An outlet 60 in the sealed portion of the housing communicates with the outlet pipe 21, and a filler cap device 61 permits the addition of ink to the sealed interior, as will later be more fully described.

When the motor 33 is energized the rotor 37 starts to rotate and it is pulled axially into the hole in the soft iron pole piece 36 against the bias of spring 25, thereby meshing gear 39 into gear train 40, 41, 42, 44, 47 to drive rack 48 toward the left, thereby putting under pressure the ink 62 within the enclosure. The motor stalls when a given, desired amount of pressure is exerted on the ink in the reservoir, for example, at a pressure of about 15 p.s.i. The motor continues to exert its stall torque, and the reservoir remains at the given pressure as ink is removed therefrom over a period of time. Thus, throughout the use of the entire ink supply, substantially constant ink pressure is maintained at all times while the device is in operation, and this pressure is independent of the rate of relative motion between pen tip and record chart. No air is admitted to the system as ink is withdrawn therefrom, thereby reducing to a minimum any tendency of the ink to dry.

When the switch 19 is opened to de-energize the motor 33, spring 25 moves the armature axially back into its original position and moves gear 39 out of engagement with gear 40. This decouples or declutches the rack 48 and gear train from the rotor, thereby permitting the rack to move toward the right to relieve the pressure on the system. Valve 22 in the feed line 21–23 remains open for a short period of time to permit a small amount of the ink in line 23 and in the manifold system 24 and in the pens 14 to flow back into reservoir 20, thereby relieving the pressure at the pen tips so that the pens can be lifted from the paper to change them or to insert a new chart. Valve 22 then closes. This holds non-pressurized ink in the system between valve 22 and the tip of pen 14 so that when the system is reenergized to pressurize the ink, the pen will immediately start to write.

To refill the reservoir 20 the system is deenergized to decouple the rack 48 from the motor. A threaded sealing cap 70 is removed from the end member 58 and the end of an ink filled syringe 71 is screwed into the slanted, threaded hole 78 in the valve seat member 74 which is press-fitted in the end member 58. The plunger of the syringe is depressed generating sufficient pressure to force the ink to move a check valve plate 73 away from the valve seat and allow the ink to flow through passageway 75 and through holes 76 into the reservoir 20. This pressure moves the decoupled piston and rack to the right to provide room for the ink. When the syringe is removed the wire spring 77 forces plate 73 against the valve seat member 74 to effect a seal. Thereafter the sealing cap 70 is replaced.

To enable the operator to readily ascertain the amount of ink remaining in the reservoir a gage wire 80 is connected to the piston 51 by screw 81 and a pointer 82 is located over a scale 83 to indicate location of the piston within the reservoir.

The time delay valve 22 is comprised of three housing portions 90, 91 and 92 bolted together by bolts 94 to form a sealed enclosure. The ink outlet pipe 21 from pressurized reservoir 20 extends through housing portion 92 to a passageway 93 to permit ink under pressure to fill annular space 94 around the valve stem 95. The pressure is sufficient to lift the check valve disk 96 against the bias of spring 97 and fill annular chamber 98 and 99 with ink under pressure. The ink under pressure acting on the large annular area of face 100 compresses spring 102 mounted around stem 101 and permits the ink to fill the annular chamber 104 outside of bellows 103 which seals the ink within the housing and prevents it from leaking out of the port 105. Movement of stem 101 and valve stem 95 against spring 102 opens the valve whose seat is formed by the O ring 107 to allow the pressurized ink to flow out of pipe 23.

When the recording operation is terminated ink pressure in the reservoir 20 and in the pipe 21 is reduced, as has been explained. Since the tip of the pen 14 is sealed against the record chart the ink pressure in the manifold 24 must be relieved by reverse flow of the ink through pipe 23 back into chamber 94, passageway 93 and pipe 21 to the reservoir 20. The valve formed by stem 95 and O ring 107 is kept open for a short period of time because the ink under pressure in chamber 104 can escape only through the small clearance 110 between valve disk 96 and the stem 95. Spring 102 urges the stems 101 and 95 toward the right tending to force the ink in compartment 104 through the small clearance 110 until the stem 95 seals with O ring 107 and the annular ridge 111 rests on the body portion 91. The ink pressure in the manifold and in the pen has been reduced to zero, but the system remains full of ink for instantaneous resumption of an inking operation. An adjustable air valve 112 may be secured in the vent 105 to regulate the rate at which air can flow into the inside of bellows 103 to regulate the length of time the valve 95–107 remains open after the termination of a recording.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. An ink writing system for an instrument which writes on a record medium, comprising in combination, a reservoir having a given volume to contain said ink, a pen for writing on said record medium, an ink supply circuit connected to said reservoir and to said pen to supply ink to said pen, means for driving said record medium past said pen including a drive motor, pressure means for applying pressure to the outside of said reservoir thereby to tend to reduce its given volume and increase the pressure on the ink therein, circuit means connected to said drive motor and to said pressure means to energize same, and a time delay valve located in said ink supply circuit between said reservoir and said pen to relieve the pressure in said pen by permitting a small quantity of ink to run back toward said reservoir yet to maintain said ink supply circuit virtually full of ink upon termination of the energization of said pressure means.

2. An ink writing system as set forth in claim 1, further characterized by said pressure means including clutch means associated with said pressure means, said clutch means upon deenergization of said pressure means relieving pressure on said reservoir.

3. An ink writing system as set forth in claim 1, further characterized by resilient means exerting a bias against said energized pressure means, said resilient means relieving pressure on said reservoir upon de-energization of said pressure means.

4. An ink writing system for an instrument which writes on a record medium, comprising in combination, a reservoir of ink, means for pressurizing said ink in said reservoir during a writing operation, means connecting said reservoir to said pen including a time delay valve, means for opening said valve upon pressurization of said ink thereby to pressurize the ink in said pen, means terminating the pressure on said ink in said reservoir upon termination of a writing operation, and means closing said valve a given length of time after the termination of said writing operation whereby ink pressure in said pen is reduced substantially to atmospheric pressure.

5. A time delay valve for a system as set forth in claim 4, further characterized by a housing, a valve in said housing which normally is closed, inlet means to admit pressurized fluid to said housing to open said valve, outlet means connected to said housing and in communication with said valve to let pressurized ink out of said housing, a fluid storage chamber within said housing for storing fluid under pressure while said valve is open, and means to cause said fluid stored under pressure in said chamber to slowly escape therefrom and to close said valve when the pressure on said fluid in the inlet means is reduced.

6. A pressurized ink writing system for an instrument which writes on a record medium, comprising in combination, viscous ink, a reservoir to contain said viscous ink, a pen for writing on said record medium, an ink supply circuit connected to said reservoir and to said pen to supply said ink to said pen, means for driving said record medium past said pen including a drive motor, electrically energized pressure means for applying substantially static pressure to the ink in said reservoir, circuit means connected to said drive motor and to said pressure means to energize and to deenergize same, and a time delay valve located in said ink supply circuit between said reservoir and said pen to relieve the pressure in said pen by permitting a small quantity of ink to run back toward said reservoir yet to maintain said ink supply circuit virtually full of ink upon termination of the energization of said pressure means.

7. An ink writing system as set forth in claim 6, further characterized by switch means in said circuit means for substantially simultaneously energizing said motor drive and said pressure means.

References Cited

UNITED STATES PATENTS

| | | | |
|---|---|---|---|
| 3,054,109 | 9/1962 | Brown | 346—140 X |
| 3,169,821 | 2/1965 | Miller | 346—140 |
| 3,185,991 | 5/1965 | Gill et al. | 346—140 |
| 3,266,048 | 8/1966 | Schweitzer | 346—140 |

FOREIGN PATENTS

| | | |
|---|---|---|
| 753,407 | 8/1933 | France. |
| 879,239 | 11/1961 | Great Britain. |

RICHARD B. WILKINSON, *Primary Examiner.*

J. W. HARTARY, *Assistant Examiner.*